(12) United States Patent
Cornelius et al.

(10) Patent No.: US 8,299,399 B2
(45) Date of Patent: Oct. 30, 2012

(54) DEVICE FOR CONNECTING METAL SHEET AT THE EDGES

(75) Inventors: Peter Cornelius, Kasel (DE); Uwe Feis, Nohfelden/Walhausen (DE); Michael Klos, St. Wendel (DE); Stefan Leidinger, Schmelz (DE); Thomas Ralle, Primstal (DE)

(73) Assignee: ThyssenKrupp System Engineering GmbH, Heilbronn (DE)

( * ) Notice: Subject to any disclaimer, the term of this patent is extended or adjusted under 35 U.S.C. 154(b) by 544 days.

(21) Appl. No.: 12/598,496

(22) PCT Filed: Apr. 10, 2008

(86) PCT No.: PCT/EP2008/002809
§ 371 (c)(1),
(2), (4) Date: Nov. 2, 2009

(87) PCT Pub. No.: WO2008/148440
PCT Pub. Date: Dec. 11, 2008

(65) Prior Publication Data
US 2010/0089892 A1 Apr. 15, 2010

(30) Foreign Application Priority Data
Jun. 1, 2007 (DE) .......................... 10 2007 025 854

(51) Int. Cl.
*B21J 1/06* (2006.01)
*B21J 5/08* (2006.01)
(52) U.S. Cl. ...... 219/149; 219/153; 29/897.2; 29/243.5; 29/243.58; 228/136; 228/137; 228/173.1; 228/173.2; 228/173.6

(58) Field of Classification Search .................. 219/149, 219/153; 29/897.2, 243.5, 243.58; 228/136, 228/137, 173.1, 173.2, 173.6
See application file for complete search history.

(56) References Cited

U.S. PATENT DOCUMENTS

| 5,611,133 | A | 3/1997 | Toeniskoetter |
| 5,752,304 | A | 5/1998 | Toeniskoetter |
| 7,531,766 | B2 * | 5/2009 | Wang et al. ............ 219/118 |

FOREIGN PATENT DOCUMENTS

| DE | 199 27 208 | 12/2000 |
| DE | 199 42 390 | 8/2001 |
| EP | 1 038 627 | 9/2000 |
| FR | 2 708 491 | 2/1995 |
| JP | 03 057421 | 6/1991 |
| JP | 07 227677 | 8/1995 |
| WO | WO 99/03634 | 1/1999 |

* cited by examiner

*Primary Examiner* — Tu-Tu Ho
(74) *Attorney, Agent, or Firm* — McGlew and Tuttle, P.C.

(57) ABSTRACT

A device (1) is provided for connecting a metal sheet (23, 33') at the edges, particularly body sheet metal in automobiles. The device (1) includes at least one folding bed (2) for receiving at least two metal sheets, folding jaws (3) which are functionally connected to associated folding jaw supports (4), at least one thermal jointing tool (5), and at least one mass electrode (9, 9'). At least the joining tool is not attached to the folding jaws, and the joining tool contains a lever oriented away from the folding bed as a linear feed device. The lever (6) has a center of rotation (10) outside the folding bed, wherein the joining tool can swivel in the manner of a knee lever into an operating and/or non-operating position.

17 Claims, 4 Drawing Sheets

DEVICE FOR CONNECTING METAL SHEET AT THE EDGES

CROSS REFERENCE TO RELATED APPLICATIONS

This application is a United States National Phase application of International Application PCT/EP2008/002809 and claims the benefit of priority under 35 U.S.C. §119 of German Patent Application DE 10 2007 025 854.4 filed Jun. 1, 2007, the entire contents of which are incorporated herein by reference.

FIELD OF THE INVENTION

The invention relates to a device for connecting of metal sheets at the edges, particularly body sheet metal in automobiles.

BACKGROUND OF THE INVENTION

A folding method on the one hand and a folding machine on the other hand have become known through U.S. Pat. No. 5,611,133 A as well as U.S. Pat. No. 5,752,304 A. An exterior and an interior preformed metal panel are positioned between lower and upper die halves, wherein the die halves are subsequently jointed and the preformed panels are restrained within the die. A pre-folding of a corner area of the exterior metal panel is performed subsequently. This process is followed by a finish folding process of the pre-folded area. Provided in a non-folded area is at least one welding facility that joins both metal sheets by spot welding.

WO 99/03634 discloses a method and a device for welded joining of metal parts overlapping each other. Proposed therein is a resistance welding process for welding connection of metal sheets, with one end area of a metal sheet being folded around the other metal sheet. Accommodated in the area of the folding machine is at least one welding head comprised of an electrode with welding tip. In the folded area, one of the metal sheets has a kind of a projection. The connection is now achieved in that the welding head exerts a force on the fold so that the fold is fixed between the electrode and a backing plate. Subsequently, a pulsating welding current is generated that joins the two metal sheets with each other.

A method and a device for establishing a projection welding connection between metal sheet parts has become known through EP 1 038 627 BI. A projection having a triangular cross-section is preformed in one of the metal sheets to be welded. The metal sheet plates are laid one above the other so as to overlap each other. A fold is generated in the area of the projection. The metal sheet plates are welded together at the point of the projection by applying an electric current pulse of short duration, with the electric current being supplied from the side of the pressure unit to the metal sheet plate lying on top and being discharged from the metal sheet plate lying at bottom.

DE 199 27 208 B4 discloses a method and a device for connecting metal sheets at the edges, more particularly of car body metal sheets in automobile manufacturing, with the edge of an exterior metal sheet plate being folded beyond the edge of an interior metal sheet plate, and wherein the edges are pressed together and wherein the edge of at least one of the metal sheet plates is provided with embossed projections prior to folding.

While pressing the metal sheet plates together, the projections are connected by projection welding to the relevant other plate, utilizing an electrode arranged at the folding jaw. This actually compact structural form bears a disadvantage in that handling of metal sheet plates within the device is complicated.

SUMMARY OF THE INVENTION

Now, therefore, proceeding from DE 199 27 208 B4, it is the object of the present invention to provide an alternative structural form of a folding and joining machine which allows for a simplified connection of metal sheet plates in the fold area whilst the handling of metal sheet plates within the device is optimal.

This task is solved by a device for connecting metal sheets at the edges, more particularly of car body metal sheets in automobiles, said device being comprised at least of a folding bed to receive at least two metal sheets, and furthermore comprised of folding jaws functionally connected to the pertinent folding jaw supports as well as at least comprising a thermal joining tool and at least a mass electrode, with at least the joining tool being not attached to the folding jaw, and said device comprising a lever oriented away from the folding bed and serving as linear feed device, and wherein said lever has a center of rotation outside the folding bed about which the joining tool can swivel in the manner of a knee lever into an operating and/or non-operating position.

As compared with prior art in technology, it yields the following advantages and benefits:
  metal sheets to be folded can be handled and folded within the device without any problems because there are no interfering joining elements;
  the thermal connection of metal sheets in the area of the fold is performed whilst the tool components are closed, i.e. in a restrained status of metal sheets;
  direct integration of a thermal joining unit in a folding device;
  indirect joining (welding) of a folding flange by way of a unilateral set-up of welding electrodes;
  introducing the welding force by applying a mechanical knee lever principle;
  generating a post-setting movement of the welding electrodes by way of mechanical springs;
  instead of several joining tools configured as welding tools positioned in the area of tool components, it is also feasible to use soldering tools.

The inventive object is illustrated by way of an embodiment shown in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
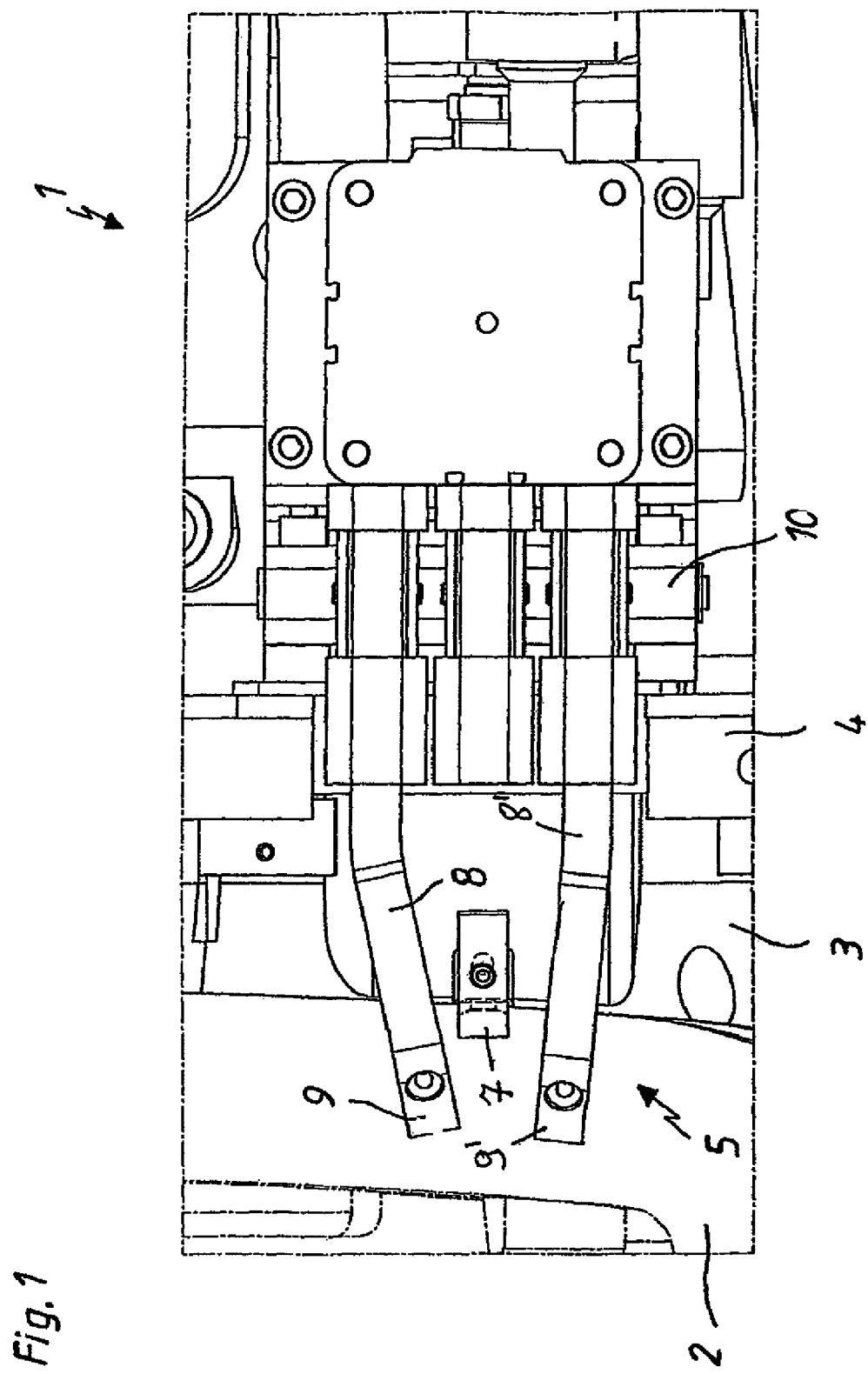
FIG. 1 is a top view onto a partial area of a folding machine.

Referring to the drawings in particular, FIG. 1 in a top view shows a partial area of a folding device 1. One can see a folding bed 2, folding jaws 3, folding jaw supports 4 as well as joining tool 5 which in this case is configured as a welding tool. The joining tools can equally be configured as a soldering tool, too. A welding electrode 7 is provided at the free end of a lever 6 (welding arm), see FIG. 4. Extending next to lever 6 is a lever element 8 (mass arm), at the free end of which a mass electrode 9, 9' is arranged. The lever 6 and the lever element 8, 8' are arranged on a common axis 10.

Figure 2:
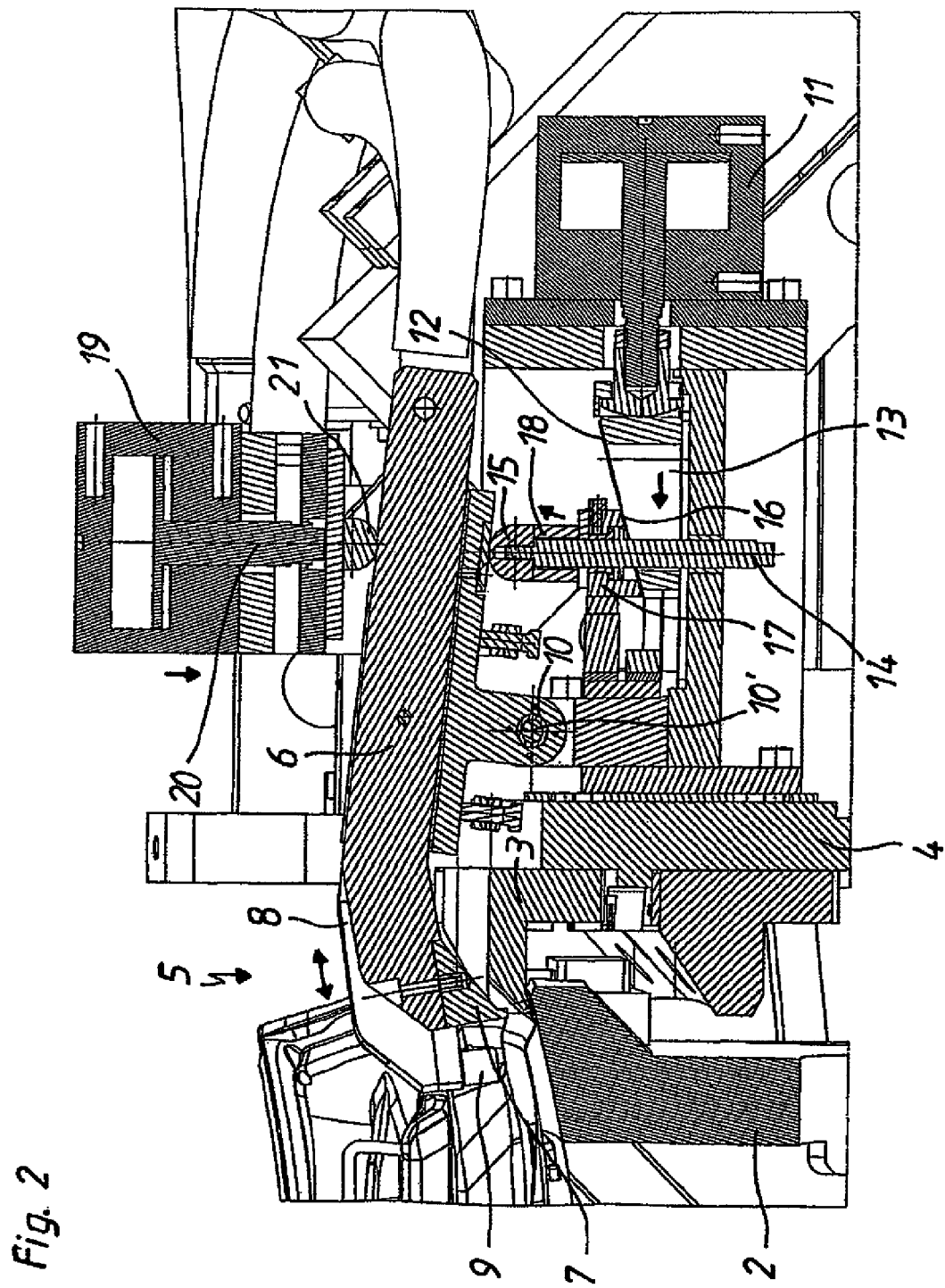
FIG. 2 is a partial sectional view of the joining tool.
Figure 3:
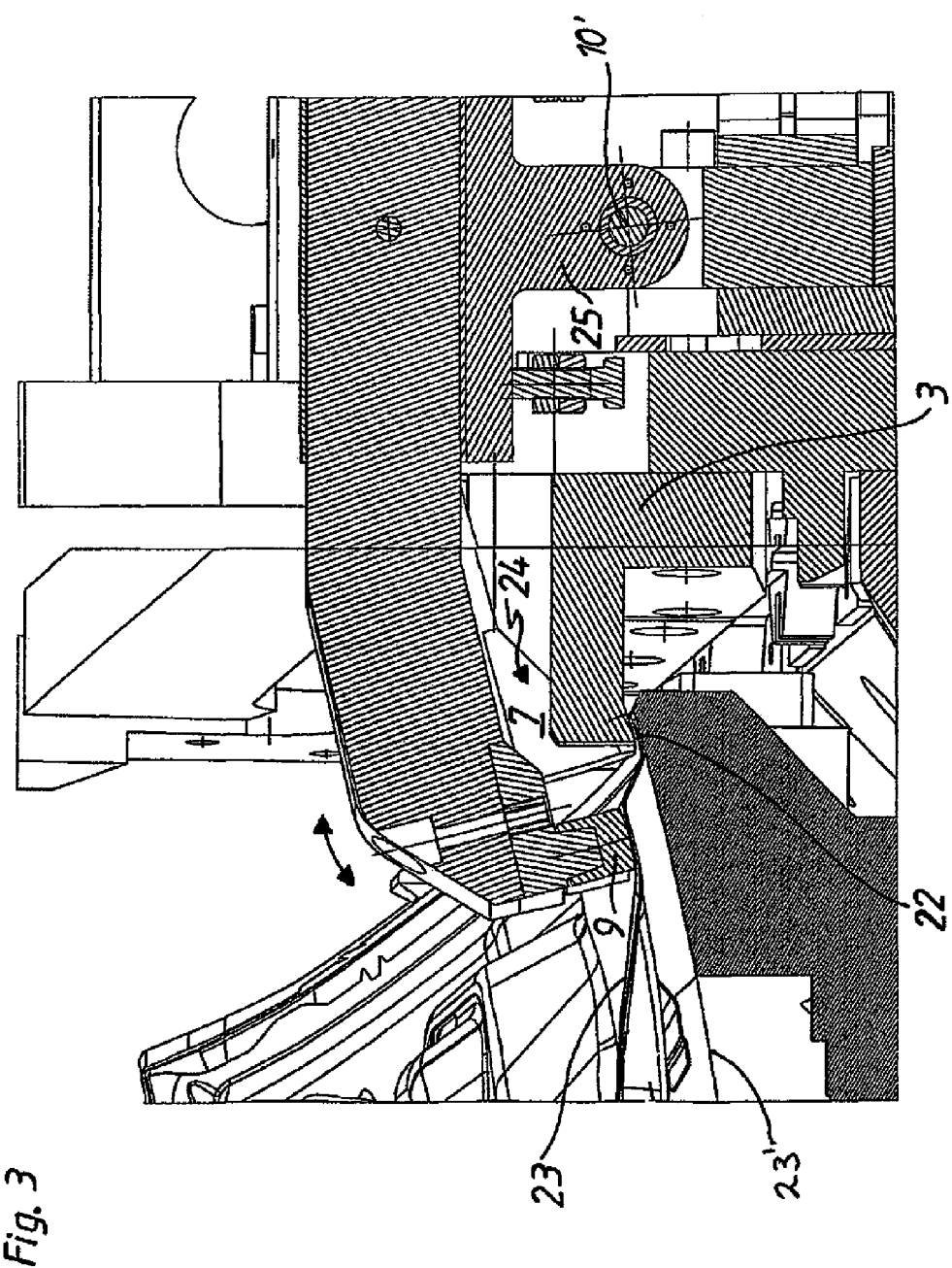
FIG. 3 is a partial sectional view of the joining tool.
Figure 4:
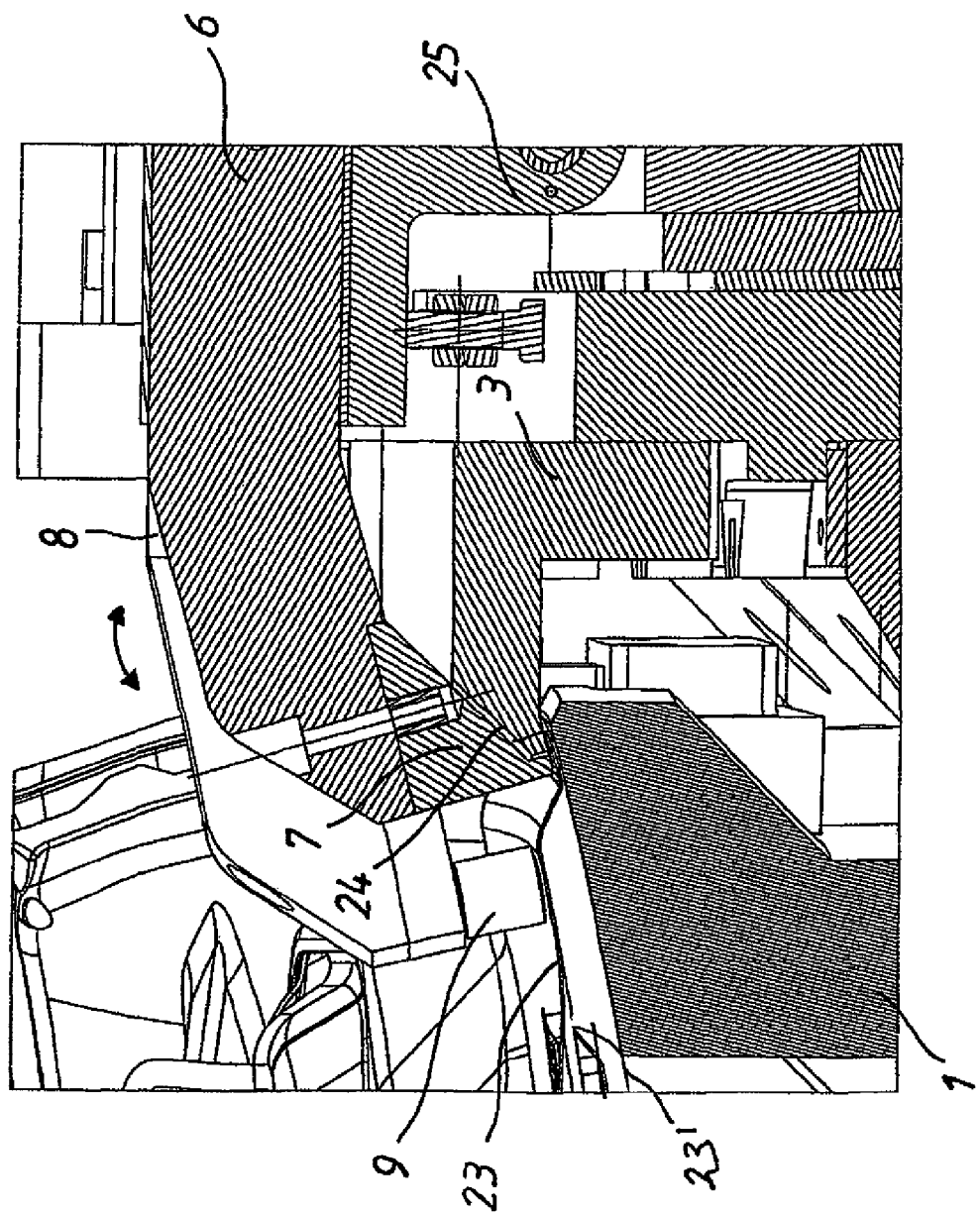
FIG. 4 is a partial sectional view of the joining tool.

FIGS. 2 to 4 show various partial views and/or sections of the joining tools. One can see the following components: folding bed 2, folding jaw 3, folding jaw support 4, lever 6, lever element 8, welding electrode 7, mass electrode 9 as well as the common axis 10. Lever 6 and lever element 8 can tilt in the manner of a knee lever about the swiveling axis 10' of axis 10.

FIG. 2 shows the non-operating position of joining tool 5. In this example, a forward stroke cylinder 11 functionally connected to a bottom wedge 13 having an inclined plane 12 is utilized for simultaneous swiveling of lever 6 and lever element 8 about swiveling axis 10'. A vertically arranged guide bolt 14 with an upper cap 15 co-acts with a top wedge 17 comprised of a second inclined plane 16. Helical springs 18 (merely shown indicatively) are provided in the area of guide bolt 14. Furthermore, a backward stroke cylinder 19, the piston rod 20 of which carries a cover 21 at its free end, is positioned above lever 6.

FIG. 3 shows the set-up of welding electrode 7 onto fold 22. One can also see the mass electrode 9 which rests on an interior metal sheet 23. Lever 6 including lever element 8 has now been swiveled about swiveling axis 10' into its operating position, with the greatest force being applied here onto fold 22.

FIG. 4 shows the process of welding in which welding electrode 7 presses fold 22 together and in which this area is thermally joined. In this state, lever 6 has reached its maximum swiveling angle. Two metal sheets 23, 23' which are connected to each other in the area of fold 22 rest on the folding bed 2 within the device 1. Lever 6 is guided in the area of a recess 23 provided in the folding jaw 3 in the direction of the fold 22. Beneath lever 6, respectively beneath lever element 8, there is a hinged lever 25 provided with axis 10.

By integrating several welding units 5 into the folding device 1, the process sequence is as follows:

Setting out from a pre-folded component flange at the exterior metal sheet 23', it is finish folded at the folding jaw 3 by an upward movement of folding bed 2. Fold 22 is laid at the interior metal sheet 23, except for the welding spot 24 recessed in the folding jaw 3, with it being possible for the welding electrode 7 to immerse contact-free into the folding jaw 3.

Subsequently, the welding electrodes 7 are now set onto fold 22. This is accomplished by activating the two cylinders 11, 19 of the joining tool 5. While the backward stroke cylinder 19 moves upwardly and releases the movement of the welding arms 6, the piston rod of the forward stroke cylinder 11 takes a move to the left. By this movement, the bottom edge 13 is pressed against the top wedge 17. The force diverted via the wedge translation presses the guide bolt 14 and the cap 15 against the arms 6,8, 8' carrying electric current. Fixed and arranged in a pivoting support in the hinged lever 25, the welding electrodes 7 are set via these arms onto the fold 22 of the exterior metal sheet 23'. By the existing force of forward stroke cylinder 11, a pre-tensioning force is built-up in each helical spring (18). This force is necessary to press the fold 22 at the exterior metal sheet onto an embossed projection in the interior metal sheet 23 and to establish an electrical contact between both metal sheets 23, 23' which is required for welding. By applying an electric current pulse at all arms 6, 8, 8' carrying electric current, both parts are welded with each other by means of ohmic transition resistance between fold 22 of exterior metal sheet 23' and embossed projection in the interior metal sheet 23. The process force required for resistance welding is assured by a post-setting of all welding unit components carrying electric current, i.e. welding electrodes 7, 9, 9' and welding arms 6, 8, 8'. All components carrying electric current are electrically isolated versus the bearing rack. Upon collapsing of the embossed projection, fold 22 of exterior metal sheet 23' rests on interior metal sheet 23, the supply of electric current is interrupted and welding has been completed. Subsequently, by way of moving forward stroke cylinder 11 backwards, the entire movement chain up to the welding electrodes 7, 9 is made powerless and the bottom wedge 13 is released. Next the backward stroke cylinder 19 moves downwards, thus lifting the welding electrodes 7, 9 via welding arms 6,8 and hinged lever 25 from metal sheets 23, 23' and arresting them. Subsequently, the folding bed 2 again moves downwards and the folding process is completed.

While a specific embodiments of the invention has been described in detail to illustrate the application of the principles of the invention, it will be understood that the invention may be embodied otherwise without departing from such principles.

The invention claimed is:

1. A device for connecting metal sheet at the edges, the device comprising:
   a folding bed for receiving at least two metal sheets;
   folding jaw supports;
   folding jaws functionally connected to associated said folding jaw supports;
   a thermal jointing tool; and
   a mass electrode, wherein the thermal jointing tool and the mass electrode is not attached to the folding jaws, and wherein the thermal jointing tool and the mass electrode are each arranged on a lever oriented away from the folding bed, and wherein the levers have a center of rotation outside the folding bed, about which the thermal jointing tool and mass electrode are pivotal into an operating or non-operating position, the levers being arranged to run approximately parallel to one another, and the levers being pivotal in a controlled manner via actuating elements or auxiliary means.

2. A device according to claim 1, wherein the joining tool comprises a welding or soldering tool.

3. A device according to claim 1, wherein the relevant folding jaw is provided with a recess into which the lever coacts with the joining tool to be fed in the direction of the folded edge.

4. A device according to claim 1, wherein the lever is hinged to frame parts of the device.

5. A device according to claim 1, wherein a cylinder operable via a medium is functionally connected via auxiliary means to a first actuating element so that the lever can be guided into the operating position on activating the cylinder.

6. A device according to claim 1, further comprising another actuating element lying opposite to the first actuating element and moving the lever into the non-operating position after joining the fold.

7. A device according to claim 5, wherein the auxiliary means are formed by wedges provided with inclined planes, wherein one wedge thereof can be fed by components of said cylinder into the direction of the other wedge.

8. A device according to claim 1 further comprising spring elements provided at the lever.

9. A device for connecting automobile body sheet metal sheet edges, the device comprising:
- a folding bed for receiving at least two automobile body metal sheets;
- folding jaw supports;
- folding jaws operatively connected to said folding jaw supports;
- a thermal jointing tool not attached to the folding jaw, the thermal jointing tool comprising a lever with a center of rotation swivel axis outside of a region of said folding bed, said thermal joining tool swiveling about said swivel between an operating and a non-operating position;
- a mass electrode for contact with one of the automobile body metal sheets; and
- a mass arm connected to said mass electrode, said mass electrode swiveling on a pivot point about said swivel axis between an operating and a non-operating position, said pivot point being outside of a region of said folding bed, said lever and said mass arm extending substantially parallel to one another, said lever and said mass arm being pivotal in a controlled manner via actuating elements or transmission means.

10. A device according to claim 9, wherein the joining tool comprises a welding or soldering tool.

11. A device according to claim 10, wherein one of the folding jaws is provided with a recess into which the lever acts with the welding or soldering tool to be fed in the direction of the folded edge.

12. A device according to claim 9, further comprising device frame parts wherein the lever is hinged to said frame parts.

13. A device according to claim 9, further comprising actuating elements and transmission means for guiding the lever linear feed device from the non-operating position into the operating position or vice-versa.

14. A device according to claim 13, wherein said actuating elements comprise a cylinder operable via a medium and functionally connected via said transmission means to a first actuating element so that said lever can be guided into the operating position on activating the cylinder.

15. A device according to claim 14, wherein said actuating elements further comprise another actuating element lying opposite to the first actuating element and moving the lever into the non-operating position after joining a fold.

16. A device according to claim 14, wherein said transmission means comprise wedges provided with inclined planes, wherein one of said wedges can be fed by components of said cylinder into the direction of another of said wedges.

17. A device according to claim 9, further comprising spring elements provided at said lever.

* * * * *